Jan. 15, 1952     W. K. BODGER     2,582,674
OVERSPEED GOVERNOR
Filed May 18, 1946
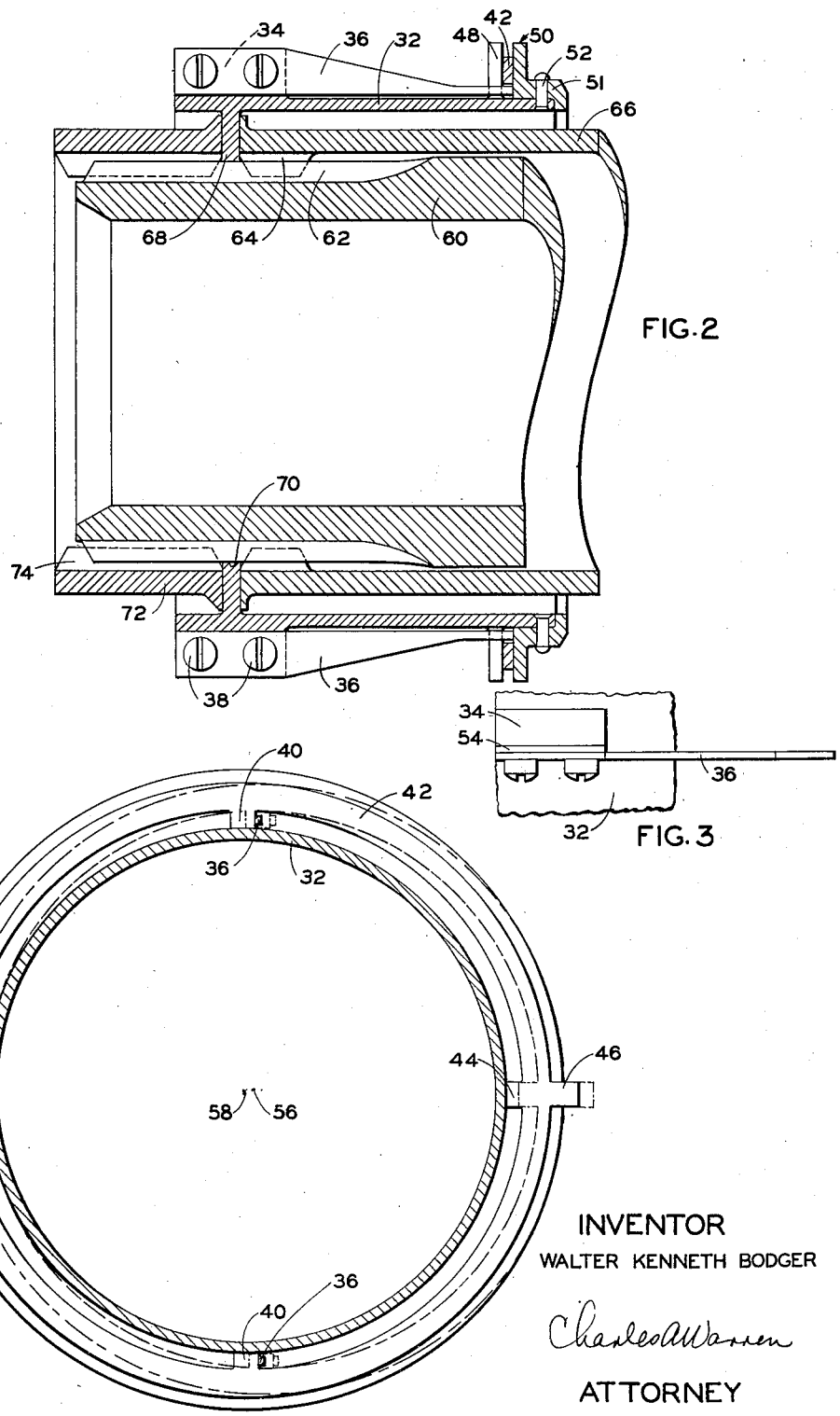
INVENTOR
WALTER KENNETH BODGER
Charles A. Warren
ATTORNEY Patented Jan. 15, 1952

2,582,674

UNITED STATES PATENT OFFICE 2,582,674

OVERSPEED GOVERNOR

Walter Kenneth Bodger, Glastonbury, Conn., assignor to United Aircraft Corporation, East Hartford, Conn., a corporation of Delaware Application May 18, 1946, Serial No. 670,727

8 Claims. (Cl. 264—18)

This invention relates to a governor adapted for accurately limiting the maximum speed of a device such as a turbine.

In overspeed governors for high speed devices the governor must be sensitive enough to function within the allowable overspeed range since many devicees operate at speeds close to the maximum permissible limit. The conventional governor consisting of a sliding plug, the movement of which is resisted by a helical spring, has the disadvantage that the spring as well as the weight is affected by centrifugal force and its operation is not accurate enough for many installations. This type of governor is also difficult to design with the required accuracy because of the factors involved. A feature of this invention is a governor in which the action of the spring is substantially independent of the action of centrifugal force.

In many installations it is desirable to mount the governor between the ends of a shaft and externally of the shaft. A feature of the invention is a governor which can be mounted in this way and will still retain the desired sensitivity. Another feature is a governor which can be mounted in such a way as to leave the center of the shaft free from obstruction.

For greatest sensitivity the centrifugal force acting on the weight should increase with much greater rapidity than the spring force so that the governor will operate quickly at the required speed. A feature of the invention is a governor so arranged that the cantilever spring normally supports the weight so that if the governor weight is free its center of gravity is spaced from the axis of the shaft. A stop is then placed in position to hold the weight with its center of gravity on the opposite side of the axis of the shaft and with the cantilever spring holding the weight against the stop.

Other objects and advantages will be apparent from the specification and claims, and from the accompanying drawing which illustrates an embodiment of the invention.

Fig. 1 is a sectional view showing the overspeed device.

Fig. 2 is a sectional view of the device of Fig. 1 mounted on a shaft.

Fig. 3 is a fragmentary plan of the spring of Fig. 2.

As shown in Figs. 1–3 the overspeed governor consists of a sleeve 32 which has substantially diametrically spaced projecting lugs 34 to which cantilever springs 36 are attached as by screws 38. These springs, as shown, taper toward the free end and are positioned so that the plane of the spring passes substantially through the axis of the shaft. The free ends of the springs engage inwardly projecting lugs 40 on the ring 42 that forms the mass of the governor. This ring may have another inwardly projecting lug 44 which limits the movement of the ring 42 under the action of the springs 36. The ring may also have an outwardly projecting lug 46 the function of which is to engage and actuate the mechanism which is made responsive to the action of the governor. The mechanism may include a wire forming a part of an electrical circuit with the wire in a position to be engaged and cut by the lug 46 when it moves into the dot-dash position shown as a result of overspeeding of the shaft on which the governor is designed to be mounted.

The ring 42 may be guided by flanges 48 and 50, the spacing of which is slightly greater than the thickness of the ring. As shown, flange 48 is integral with the sleeve 32 and flange 50 is carried by a sleeve 51 which may be held on the end of the sleeve 32 as by one or more rivets 52.

Instead of clamping the spring 36 directly to the lug 34 it may be spaced from the surface of the lug by a shim 54 (Fig. 3) of laminar construction so that the action of the spring on the ring may be changed by the removal of one or more of the laminations of the shim. In this way the effective speed of the governor may be varied.

The construction is such that the springs 36 are under a predetermined load when the ring is in the full line position of Fig. 1 and resist movement of the ring into the dot-dash line position shown. The center of mass of the ring 42 is at a point 56 spaced from the axis of rotation 58 of the governor and when the governor reaches a predetermined speed the centrifugal force acting on the ring will overcome the holding action of the springs and cause the governor to move rapidly into the dot-dash line position.

The governor may be assembled and tested before it is mounted on the device the speed of which it is intended to govern. As best shown in Fig. 2 the governor may be mounted on a hollow rotary shaft 60 having splines 62 engaged by cooperating splines 64 on a sleeve 66. The sleeve 32 may have an inwardly projecting flange 68 the innermost surface 70 of which is concentric to the sleeve and is piloted on the outer surface of the shaft which, in this case, is the surface of the splines 62. The flange 68 is clamped between the sleeve 66 and another clamping sleeve 72 which may also have splines 74 engaging with the splines 62 on the shaft.

In the arrangement described the springs are so arranged that bending is only slightly affected by the centrifugal force acting on the springs. The springs bend at right angles to the axial plane passing through the springs and the centrifugal force acting on each spring has substantially no effect on the action of the spring in holding the ring in position.

In the construction described the operation of the governor is extremely rapid and can therefore function as an exact limitation on the maximum permissible speed for the shaft.

It is to be understood that the invention is not limited to the specific embodiments herein illustrated and described, but may be used in other ways without departure from their spirit as defined by the following claims.

I claim:

1. An overspeed governor having a rotating element including a ring surrounding a part of said element, spaced cantilever springs supporting said ring for movement substantially in a radial direction, said springs being mounted on said element and having their free ends connected to the ring, said springs extending substantially in an axial direction between the element and the ring and normally supporting the ring with its center of gravity spaced from one side of the axis of rotation of the element, and a stop engaging the ring and supporting it against the action of the springs in a position with its center of gravity on the opposite side of the axis of rotation of the element.

2. An overspeed governor having a rotating element including a ring surrounding a part of said element, spaced cantilever springs supporting said ring for movement substantially in a radial direction, said springs being mounted on said element and having their free ends connected to the ring, said springs extending substantially in an axial direction between the element and the ring.

3. An overspeed governor having a rotating element including a ring surrounding a part of said element, spaced cantilever springs supporting said ring for movement substantially in a radial direction, said springs normally supporting the ring with its center of gravity spaced from and on one side of the axis of rotation of the element and a stop engaging the ring and supporting it against the action of the springs in a position with its center of gravity on the opposite side of the axis of rotation of the element, said springs being spaced substantially 180 degrees apart.

4. An overspeed governor comprising a rotating element including a ring surrounding a part of said element, spaced cantilever springs supporting said ring for movement substantially in a radial direction, said springs normally supporting the ring with its center of gravity spaced from and on one side of the axis of rotation of the element and a stop engaging the ring and supporting it against the action of the springs in a position with its center of gravity on the opposite side of the axis of rotation of the element, said springs being spaced substantially 180 degrees apart, and said stop for the ring located substantially midway between the two springs.

5. An overspeed governor including a sleeve, a pair of cantilever springs mounted substantially on diametrically opposite sides of the sleeve, a ring larger in diameter than the sleeve and guided by said sleeve, said ring being free to move in a radial direction, said springs engaging said ring and holding it radially with a part of said ring in engagement with the sleeve and with the center of mass of the ring eccentric to the axis of the sleeve.

6. An overspeed governor assembly for mounting on a rotary shaft, said governor including a sleeve, a pair of cantilever springs mounted substantially on diametrically opposite sides of the sleeve, a ring larger in diameter than the sleeve and guided by said sleeve for free movement in a radial direction, said springs engaging said ring and holding it against radial movement with a part of said ring in engagement with the sleeve and with the center of mass of the ring eccentric to the axis of the sleeve, said sleeve having an inwardly projecting flange adapted to be clamped against a shoulder on the shaft.

7. An overspeed governor assembly for mounting on a rotary shaft, said governor including a sleeve, a pair of cantilever springs mounted substantially on diametrically opposite sides of the sleeve, a ring larger in diameter than the sleeve and guided by said sleeve for free movement in a radial direction, said springs engaging said ring and holding it against radial movement with a part of said ring in engagement with the sleeve and with the center of mass of the ring eccentric to the axis of the sleeve, said sleeve having an inwardly projecting flange adapted to be clamped against a shoulder on the shaft, the inner periphery surface of the flange being concentric to the sleeve to pilot it on the shaft.

8. An overspeed governor including a sleeve, a pair of cantilever springs mounted substantially on diametrically opposite sides of the sleeve and substantially in axial planes so that the springs deflect substantially at right angles to the axial plane to minimize centrifugal action on the spring, a ring larger in diameter than the sleeve and guided by said sleeve for movement in a radial direction, said springs engaging said ring and holding it against radial movement, with a part of said ring in engagement with the sleeve and with the center of mass of the ring eccentric to the axis of the sleeve.

WALTER KENNETH BODGER.

REFERENCES CITED

The following references are of record in the file of this patent:

UNITED STATES PATENTS

| Number | Name | Date |
|---|---|---|
| 391,114 | Brush | Oct. 16, 1888 |
| 859,338 | Samuelson | July 9, 1907 |
| 859,387 | Junggren | July 9, 1907 |
| 1,076,472 | Wilkinson | Oct. 21, 1913 |
| 2,099,583 | Vincent | Nov. 16, 1937 |
| 2,254,520 | Garrott | Sept. 2, 1941 |
| 2,290,588 | Grondahl | July 21, 1942 |
| 2,388,282 | Otto | Nov. 6, 1945 |

FOREIGN PATENTS

| Number | Country | Date |
|---|---|---|
| 184,824 | Germany | May 21, 1907 |